United States Patent [19]
Corbi

[11] Patent Number: 5,621,400
[45] Date of Patent: Apr. 15, 1997

[54] ICE DETECTION METHOD AND APPARATUS FOR AN AIRCRAFT

[76] Inventor: Ronald W. Corbi, 368 Edgewood Dr., Columbiana, Ohio 44408

[21] Appl. No.: 524,637

[22] Filed: Sep. 7, 1995

[51] Int. Cl.⁶ .................................................. G08B 21/00
[52] U.S. Cl. ........................... 340/962; 340/580; 324/72; 324/72.5; 324/76.11; 73/304 R; 244/134 R
[58] Field of Search ........................... 340/580, 581, 340/582, 583, 514, 593, 596, 603, 604, 650, 962; 324/72, 72.5, 76.11; 73/304 R; 244/134 R

[56] References Cited

U.S. PATENT DOCUMENTS

| | | | |
|---|---|---|---|
| 2,432,669 | 12/1947 | Kliever | 144/134 A |
| 3,045,223 | 7/1962 | Kapany et al. | 340/583 |
| 3,781,676 | 12/1973 | Williams | 324/72.5 |
| 3,882,381 | 5/1975 | Gregory | 340/580 |
| 4,268,824 | 5/1981 | Phillips | 340/604 |
| 4,398,412 | 8/1983 | Huneidi | 73/32 R |
| 4,667,149 | 5/1987 | Cohen et al. | 324/64 |
| 4,873,510 | 10/1989 | Khurgin | 340/580 |
| 4,931,775 | 6/1990 | Sheriff | 340/604 |
| 5,021,769 | 6/1991 | Schuellein | 340/580 |
| 5,136,234 | 8/1992 | Shaw | 324/72 |
| 5,144,227 | 9/1992 | Shaw | 324/149 |
| 5,180,122 | 1/1993 | Christian et al. | 340/583 |
| 5,313,202 | 5/1994 | Hansman, Jr. et al. | 340/962 |
| 5,486,768 | 5/1994 | Silvus, Jr. et al. | 324/718 |
| 5,508,622 | 12/1994 | Gatzlaff et al. | 324/558 |

Primary Examiner—Jeffery Hofsass
Assistant Examiner—Benjamin C. Lee
Attorney, Agent, or Firm—Harpman & Harpman

[57] ABSTRACT

A method an apparatus for detecting icing on an aircraft particularly flight surfaces by using the electrical insulating properties of ice on a conductive wing surface utilizing a simple conductive current device engageable selectively on the suspect flight surfaces.

6 Claims, 2 Drawing Sheets

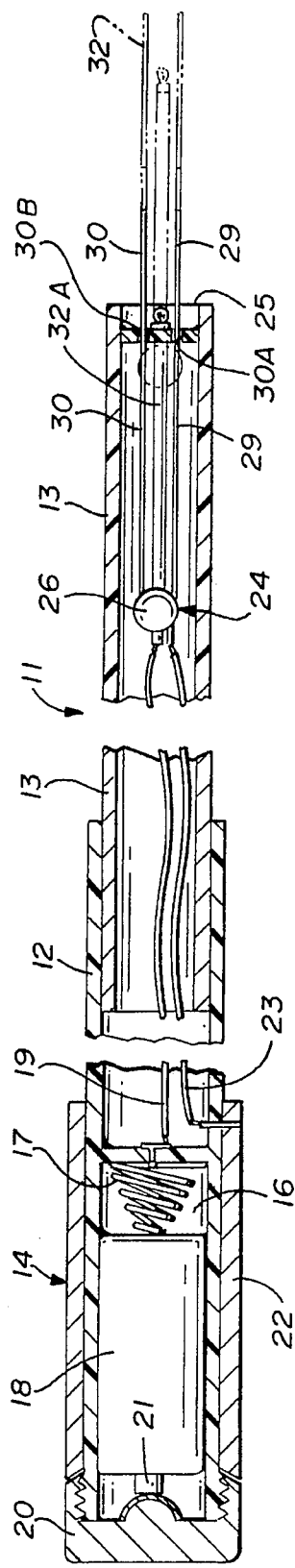
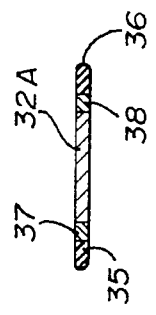
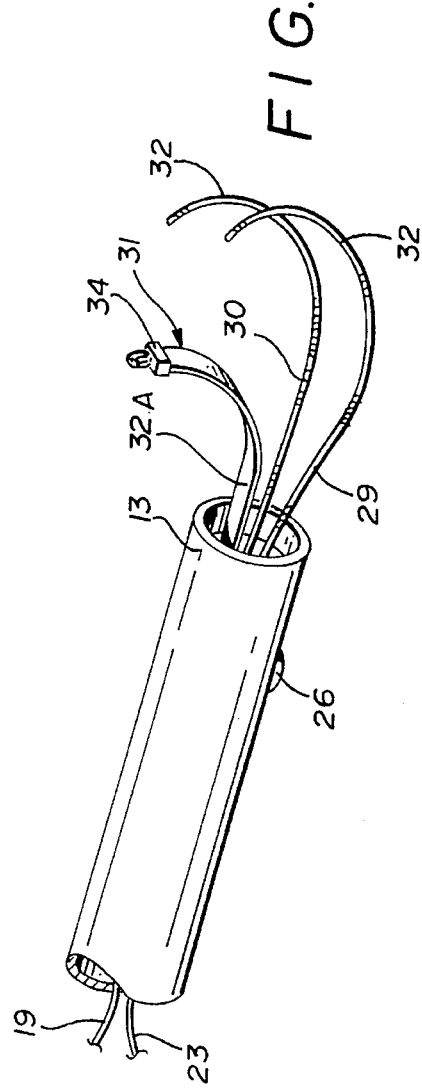
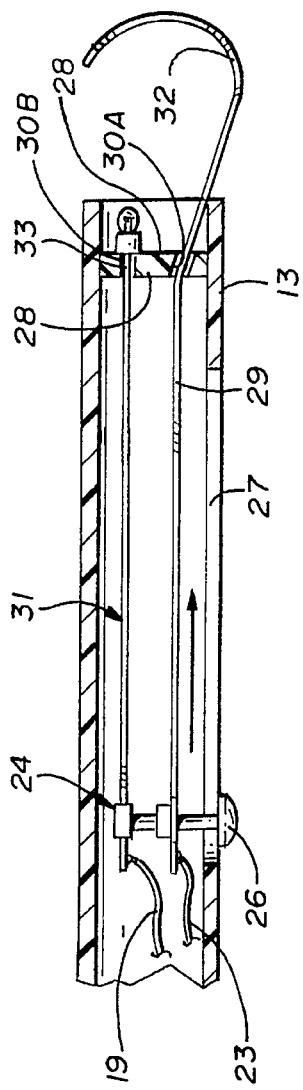

ICE DETECTION METHOD AND APPARATUS FOR AN AIRCRAFT

BACKGROUND OF THE INVENTION

1. Technical Field

This invention is directed to an aircraft icing detector which is critical in determining aircraft performance and safety. Ice accumulation on flight surfaces will often occur in conditions that would not seem likely. Modern aircraft design having more efficient wing characteristics make them more vulnerable to any ice accumulation that will decrease the lift efficiency and increase drag. If surface friction is increased by contamination and surface roughness which can be directly attributed to ice accumulation, increased drag will occur with flight performance and stabilization will be effected. Modern aircraft store fuel in the wings which will be chilled during flight thus creating lower flight surface temperatures which when combined with the ambient moisture content of the surrounding air can form ice even in non-freezing air conditions that would not normally be conducive to ice formation.

Clear ice formations on flight surfaces is especially dangerous since it cannot readily be seen by visual inspection and requires careful hands on inspection by properly trained personnel. Ice detection on aircraft's critical upper wing surface areas are difficult to inspect due to the wing height and wing dimension. Normal inspection procedures on such aircraft require a step ladder be positioned adjacent the wing allowing the inspection personnel to physically climb high enough so that a wide section of the wing area can be inspected by hand. Engine blade icing is also of a critical concern when ice forms on the fan blade surfaces found in modern jet and turbo-prop aircraft. Engine damage is caused by ice injection during take-off when ice breaks away from flight surfaces in front of the engine and is ingested impinging against the fan blades causing damage which can effect flight performance and engine output.

2. Objects and Advantages

It is the object of this invention to provide for a simple self-contained ice detection device that can be readily used by flight and ground personnel to easily and quickly inspect critical wing surfaces for the presence of ice especially clear ice which is less readily detectable by visual inspection.

An advantage of the invention is directed towards the absolute determination of ice presence by the relative conductivity of the wing surface allowing the flight and ground personnel to inspect the wing without physically touching it which heretofore is the most effective and most fail safe method of determining the accumulation of clear ice.

Description of Prior Art:

Prior art devices to help determine the presence of ice on flight surfaces before take-off have relied on both visual inspection and hands on inspection by flight and ground personnel, see for example U.S. Pat. Nos. 5,313,202, 5,180,122, 4,398,412, 3,045,223 and 2,432,669.

In U.S. Pat. No. 3,045,223 an ice detection device is disclosed that utilizes light transmission between a light source and detector to determine the presence of foreign material therebetween.

U.S. Pat. No. 4,398,412 is directed to a device to determine frost depth and density by using a hand held visual gauge through which the frost can be cited and thus measured.

U.S. Pat. No. 2,432,669 responds to the formation of ice by using the electrical capacitance principle in which one plate of the condenser is the pick-up dish mounted to an insulated plate on the wing. The other condenser plate is the wing itself thus measuring oscillating electrical fields between same as ice forms thereon.

U.S. Pat. No. 5,180,122 on an apparatus for de-icing illustrates apparatus and method for detecting ice on a flight surface by using a video camera to detect effect surface color differences which are processed to determine the presence of ice and the direction of a de-icing gun.

U.S. Pat. No. 5,313,202 relates to ice detection by determining the latant heat release as water freezes between two surfaces of a roter blade aircraft or the like.

SUMMARY OF THE INVENTION

The present invention is directed to the detection of ice on flight surfaces by direct surface contact by detection probes that determines the ice presence by the relative conductivity and non-conductivity therebetween. The probes form a conductive loop in a simple electrical circuit having a source of power and circuit completion indicator.

DESCRIPTION OF THE DRAWINGS

FIG. 5 is a partial cross-sectional view of a probe configuration with portions broken away;

FIG. 6 is a partial perspective view of probe engagement and detection elements;

FIG. 7 is an enlarged cross-sectional view of the probe engagement portion illustrated in FIG. 5; and FIG. 8 is an enlarged cross-sectional view of a spring light support band.

DESCRIPTION OF THE PREFERRED EMBODIMENT

Figure 1:
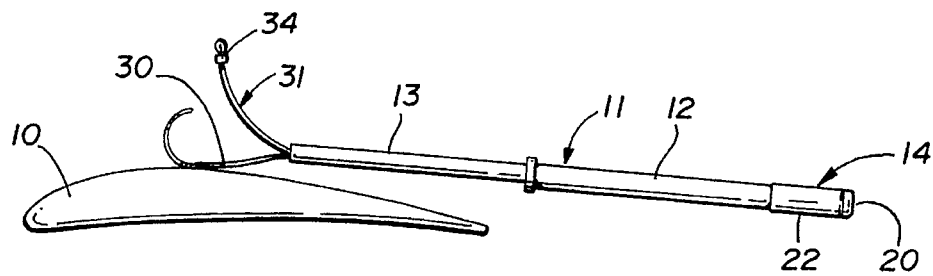
FIG. 1 illustrates a wing portion and ice detection device of the invention in operation.

Referring to FIG. 1 of the drawings, the present invention utilizes the principal of surface conductivity to indicate the presence of a non-conductive condition such as ice on a wing surface 10 where ice is expected to form. Referring now to FIGS. 1, 3, 5, 6, and 7 of the drawings an ice probe 11 can be seen as chosen for illustration comprising telescopically extensible tubular body members 12 and 13. A handle portion 14 is positioned on the tubular body member 12's free end having a power cell chamber 16 therein. The power cell chamber 16 is configured similar to a simple battery powered flashlight wherein batteries are held and the enclosure forms part of the power circuit.

Referring specifically to FIG. 5 of the drawings, the power cell chamber 16 can be seen having a contact spring 17 engaging a battery 18 with a lead wire 19 extending therefrom. A threaded metal end cap 20 is engageable with a battery terminal 21 and a conductive metal housing 22 that interconnects with a lead wire 23. The inner engaging tubular members 12 and 13 are typically of non-conductive material forming a passageway for the lead wires 19 and 23 that are connected to a probe deployment assembly 24 best seen in FIGS. 5, 6, and 7 of the drawings.

The probe deployment assembly 24 housed in the tubular member 13 inwardly of its free end at 25 has a support terminal activation button 26 that extends outwardly from the tubular element through a deployment slot 27 best seen in FIG. 7 of the drawings. An apertured guide disk 28 is fitted within the tubular element 13 and acts as a support and guide for a pair of conductivity probes 29 and 30 as well as a light assembly 31. The probes 29 and 30 extend outwardly through angular guide bores 30A that define an angular inclination from the longitudinal axis of the tubular element 13 as the probes 29 and 30 extend therefrom.

Figure 4:
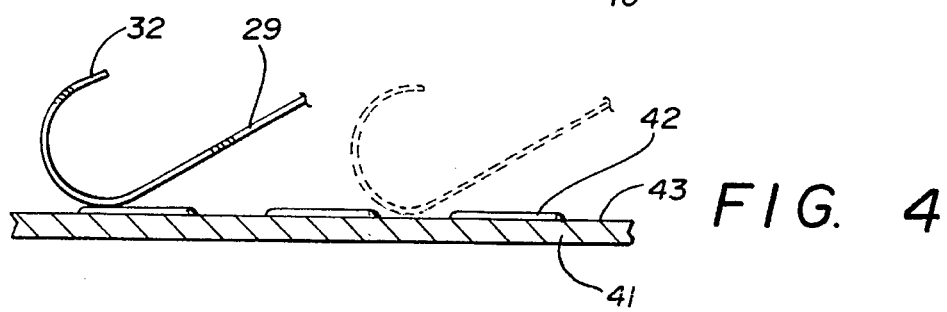
FIG. 4 is an enlarged cross-sectional view of a portion of a flight surface illustrated in FIG. 2 with a probe engaged thereon.

The probes 29 and 30 are of a spring wire composition with a curved return end configuration at 32 as they are deployed, see FIGS. 1, 4, and 6 of the drawings.

In this example, the probe wire 29 is conducted to the wire lead 23 with the remaining probe wire 30 electrically connected to the light assembly 31 via the probe deployment assembly 24. The light assembly 31 has a spring band 32 extending through a slot 33 in the support end guide disk 28. A light bulb 34 is positioned on the free end of the spring band 32 and is electrically interconnected with said probe wires 29 and 30 through the wire deployment assembly 24 by conductive portions 35 and 36 of the band 32 defined by respective insulating strips 37 and 38 therebetween as will be well understood by those skilled in the art and as best seen in FIG. 8 of the drawings.

Figure 2:
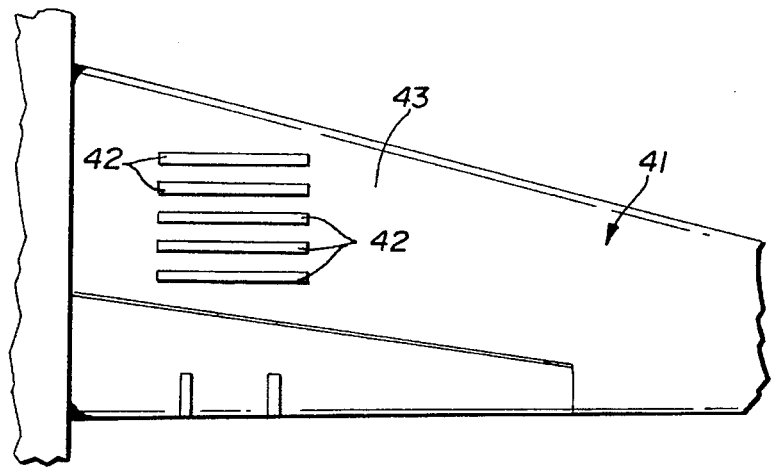
FIG. 2 illustrates an alternate upper wing surface with optional conductivity strips thereon.
Figure 3:
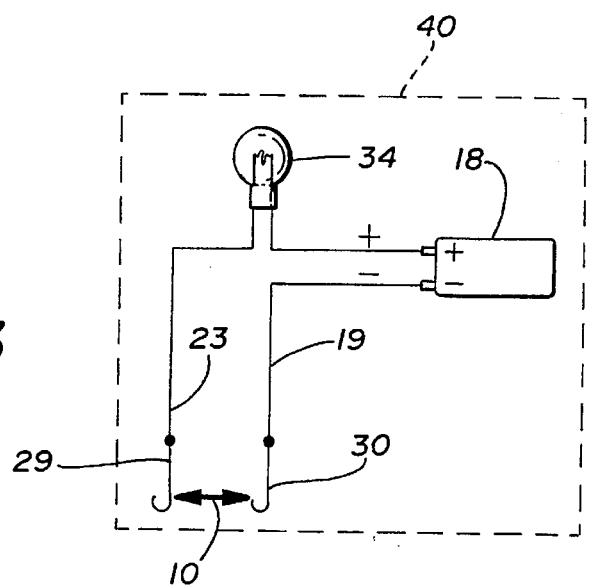
FIG. 3 is a circuit diagram of the apparatus.

In operation, the probe wires 29 and 30 and indicator light assembly are deployed by advancement of the activation button 26 as illustrated in FIG. 6 of the drawings and in broken lines in FIG. 5 of the drawings. The deployed probe wires 29 and 30 can then be passed over the wing surface 10 as best seen in FIG. 2 of the drawings thus completing the lighting circuit 40 as seen in FIG. 3 of the drawings by the relative conductivity of the wing surface therebetween. The light circuit 40 defines a simply lighting configuration with a source of power (battery 18) interconnected to the light bulb 34 by the lead wires with an equivalent switch element formed by the spaced probe wires 29 and 30 as hereinbefore described.

Upon loss of conductivity between the probe wires as will occur when passed over ice the light circuit is broken and the light 34 goes out indicating a possible icing event.

Referring back again to FIGS. 2 and 4 of the drawings, an alternate wing 41 configuration can be seen wherein the wing 41 is non-conductive having spaced parallel conductive strips on its wing surface 43 at critical areas which are prone to icing. The conductive strips 42 can be a coating of special paint surface commercially available as an apoxy copper conductivity coating series 599-Y1317, manufactured by Spraylat Corp. of Mount Vernon, N.J. which is comprised of a two component apoxy system in various thickness degrees which defines the effective conductivity of the material.

Operation of the ice probe 11 on the alternative wings 41 is the same as hereinbefore described except that the probe wires 29 and 30 are dragged over the plurality of spaced conductivity strips 40 so that the operator gets an on/off light pattern as the light 40 circuit is closed an open respectively as illustrated by the probe's position in FIG. 4 indicated as closed in solid lines and open in broken lines.

It will be evident from the above description that the ice probe 11 of the invention is fail safe since any component failure will cause open light condition warning the operator that either ice is present or the device has failed.

A simple conductivity test of the ice probe 11 can easily be made by pushing the respective spaced probe elements 29 and 30 together completing the circuit 40 as hereinbefore described.

It will be understood that the present invention is not limited by the scope of the specification since modifications and changes may be made therein without departing from the spirit of the invention and the scope is specifically directed towards the claims as herein follows:

I claim:

1. A method to detect ice on aircraft surfaces comprising the steps of:
   a. providing an apparatus comprising: a pair of spaced conductor probes each having a conductor terminal, and a light source; said probes and said light source connected to a power source so that an electric circuit is formed across the spaced conductor probe terminals which act as a switch means when bridged by a conductive medium; wherein said probe terminals and said light source are protruding from a tubular housing for use as a handle during use;
   b. contacting said probe terminals with an aircraft surface;
   c. generating a signal in said electric circuit based on the absolute electrical conductivity across said probe terminals through the contacted aircraft surface;
   d. activating said light source in case of absolute conductivity of said contacted aircraft surface as an indication of no ice being formed on said contacted aircraft surface, and deactivating said light source in case of absence of said absolute conductivity of said contacted aircraft surface as an indication of ice detected on said contacted aircraft surface.

2. The apparatus to detect ice set forth in claim 1 wherein said conductivity indicator comprises;
   a. a light bulb.

3. An apparatus to detect ice on aircraft surfaces comprising;
   a. a pair of conductivity probes extending from a support housing,
   b. said conductivity probes in spaced relation to one another,
   c. a source of power connected to said conductivity probes,
   d. a conductivity indicator connected to said power source,
   e. means for deploying said probes from said housing comprises;
      1. a deployment assembly movably positioned within said enclosure,
      2. an elongated slot in said housing,
      3. an actuation button in said slot interconnected to said deployment assembly
   f. guide means for said probes.

4. The apparatus of claim 3 wherein said probe support housing comprises;
   a. a pair of telescopically extensible tubular members of non-conductive material,
   b. said tubular members extending from a conductive housing having a chamber therein,
   c. a closure on said conductive housing electrically interconnected said conductivity probes.

5. The apparatus of claim 3 wherein said guide means comprises;
   a. an apertured element within said housing in spaced relation to said deployment assembly.

6. The apparatus set forth in claim 5 wherein said apertured element comprises,
   a. multiple guide apertures within said housing, some of said apertures being angularly disposed from the longitudinal axis of said enclosure.

* * * * *